March 20, 1945.   E. T. WEEKS ET AL   2,371,937
HYDRAULIC BRAKE ATTACHMENT
Original Filed May 9, 1942   2 Sheets-Sheet 1

Inventor
Elmer T. Weeks
Faye M. McCulley

By Clarence A. O'Brien
and Harvey B. Jacobson
Attorneys

March 20, 1945.  E. T. WEEKS ET AL  2,371,937
HYDRAULIC BRAKE ATTACHMENT
Original Filed May 9, 1942  2 Sheets-Sheet 2

Inventor
Elmer T. Weeks
Faye M. McCulley

By Clarence A. O'Brien
and Harvey B. Jacobson
Attorneys

Patented Mar. 20, 1945

2,371,937

UNITED STATES PATENT OFFICE 2,371,937

HYDRAULIC BRAKE ATTACHMENT

Elmer T. Weeks and Faye M. McCulley,
Scott Bar, Calif.

Original application May 9, 1942, Serial No. 442,354, now Patent No. 2,356,111, August 15, 1944. Divided and this application March 10, 1943, Serial No. 478,708

1 Claim. (Cl. 188—152)

This is a divisional application of our co-pending application Serial No. 442,354, filed May 9, 1942, now Patent 2,356,111, August 15, 1944.

The present invention relates to new and useful improvements in vehicle brakes having an air cooling system connected therewith and more particularly to the provision of dust-collecting cups for the brake cylinders to collect dust and dirt which may fall from the ends of the cylinder during constant operation thereof and to prevent the same from entering the air cooling system which leads from the brake housing to the engine.

A further object is to provide an attachment of this character of a simple and practical construction, which is efficient and reliable in use, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout and in which:

Figure 1:
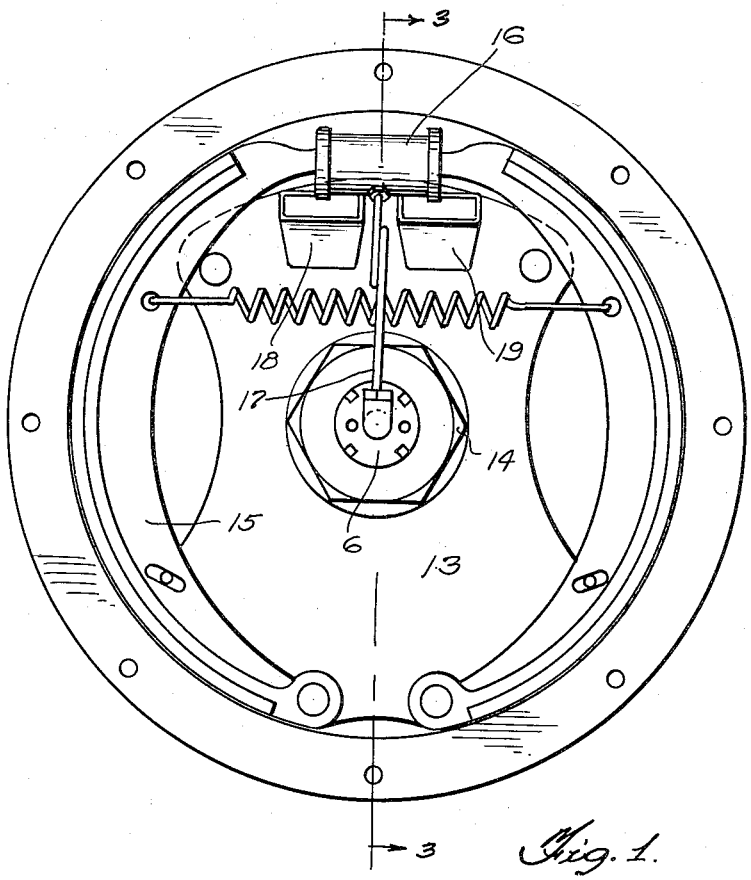
Figure 1 is a view in elevation of a vehicle brake housing with its cover plate removed and showing the dust-collecting cups positioned therein.
Figure 2:
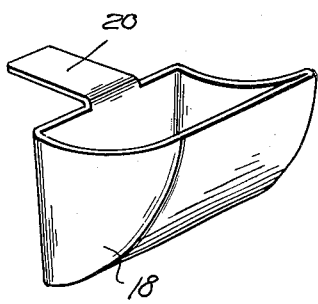
Figure 2 is a perspective view of one of the cups.
Figure 3:
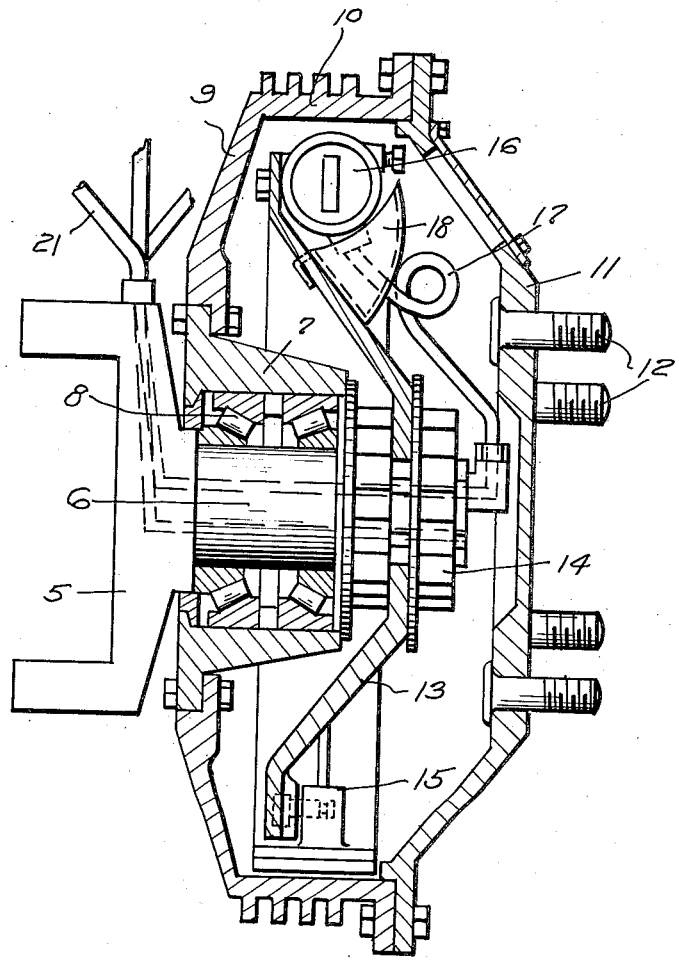
Figure 3 is a sectional view taken on a line 3—3 of Figure 1.

Referring now to the drawings in detail, the numeral 5 designates the fork-shaped spindle shoulder of a front wheel mounting on which the stub axle 6 is formed. The wheel hub 7 is journaled on the bearing assembly 8 carried by the axle and the brake drum 9 is secured to the hub.

The outer end of the brake drum is provided with an outwardly extending flange 10 to which is flatwise secured the cover plate 11 having a central portion provided with circumferentially arranged lugs 12 on which the wheel (not shown) is secured in the usual manner.

The backing plate 13 is secured on the end of the axle by the nuts 14 and on which the brake shoes 15 are mounted, the brake shoes being actuated by the usual hydraulic cylinder 16 through the pipe 17 which extends into the brake housing through the hub.

Connected to the backing plate 13 are dust-collecting cups 18 and 19, the cups being positioned under the ends of the brake cylinder and are secured in position by tongues 20 inserted through openings (not shown) in the backing plate and bent downwardly behind the backing plate.

The brake is cooled by means of air entering the housing through the pipes 21 and connected with the intake manifold of the engine (not shown) for circulating the air.

The cups 18 and 19 collect any dirt or dust which might fall from the ends of the cylinder and is thus prevented from entering the air pipes leading to the engine.

It is believed the details of construction, advantages and manner of use of the device will be readily understood from the foregoing without further detailed explanation.

Having described the invention, what is claimed as new is:

In a hydraulic brake including a backing plate having a brake cylinder mounted thereon and also having openings therein, a receptacle, and tongues on the receptacle for insertion in said openings to receive the receptacle in a position beneath the cylinder to receive dust and dirt falling from the cylinder.

ELMER T. WEEKS.
FAYE M. McCULLEY.